US011460088B2

(12) United States Patent
Tachiuchi et al.

(10) Patent No.: US 11,460,088 B2
(45) Date of Patent: Oct. 4, 2022

(54) DAMPER

(71) Applicant: AISIN CORPORATION, Kariya (JP)

(72) Inventors: Naoki Tachiuchi, Kariya (JP); Nobuaki Kurita, Kariya (JP); Sayo Yamanaka, Kariya (JP); Mitsuru Natsume, Kariya (JP); Toru Inagaki, Kariya (JP); Kento Mizuno, Kariya (JP); Toru Koyama, Kariya (JP)

(73) Assignee: AISIN CORPORATION, Kariya (JP)

( * ) Notice: Subject to any disclaimer, the term of this patent is extended or adjusted under 35 U.S.C. 154(b) by 360 days.

(21) Appl. No.: 16/695,237

(22) Filed: Nov. 26, 2019

(65) Prior Publication Data

US 2020/0173521 A1 Jun. 4, 2020

(30) Foreign Application Priority Data

Nov. 30, 2018 (JP) .............................. JP2018-226023

(51) Int. Cl.
*F16F 15/129* (2006.01)
*F16D 7/02* (2006.01)

(52) U.S. Cl.
CPC .......... *F16F 15/1297* (2013.01); *F16D 7/025* (2013.01)

(58) Field of Classification Search
CPC .............................. F16F 15/1297; F16D 7/025
(Continued)

(56) References Cited

U.S. PATENT DOCUMENTS 1,271,424 A * 7/1918 Brush .................... F16D 25/123
464/44
2,002,115 A * 5/1935 Kjaer ........................ F16D 3/14
464/44

(Continued)

FOREIGN PATENT DOCUMENTS

JP 2003-206985 A 7/2003
JP 4725348 B2 7/2011
(Continued)

OTHER PUBLICATIONS

Office Action (Notice of Reasons for Refusal) dated Jun. 23, 2022, by the Japanese Patent Office in corresponding Japanese Patent Application No. 2018-226023 and an English Translation of the Office Action. (6 pages).

*Primary Examiner* — Greg Binda
(74) *Attorney, Agent, or Firm* — Buchanan Ingersoll & Rooney PC

(57) ABSTRACT

A damper includes: first and second rotating elements rotatable around a rotation center; an elastic element elastically expanding and contracting in response to relative rotation of the first and second rotating elements; and a limiter provided in the first rotating element. The limiter includes a lining plate having a first sliding surface, a first cover plate having a second sliding surface and a first abutting surface, a second cover plate having an outer edge part and an inner edge part, and a biasing member. When a difference in torque between the lining plate and the first cover plate is a predetermined value or more, the first sliding surface slides with the second sliding surface, and the second sliding surface is inclined with respect to the first abutting surface so as to face the second direction as going radially inward in a free state of the first cover plate.

10 Claims, 6 Drawing Sheets

(58) Field of Classification Search
USPC .................................................... 464/43, 46
See application file for complete search history.

(56) References Cited

U.S. PATENT DOCUMENTS

| | | | | |
|---|---|---|---|---|
| 2,939,330 | A * | 6/1960 | Margetts | G09F 11/23 464/46 |
| 7,766,752 | B2 | 8/2010 | Saeki et al. | |
| 7,927,219 | B2 | 4/2011 | Saeki et al. | |
| 8,272,966 | B2 | 9/2012 | Saeki et al. | |
| 8,647,211 | B2 * | 2/2014 | Doman | F16D 7/025 464/46 |
| 2010/0224459 | A1 | 9/2010 | Saeki et al. | |
| 2016/0305489 | A1 | 10/2016 | Yamanaka et al. | |

FOREIGN PATENT DOCUMENTS

| | | |
|---|---|---|
| JP | 2011-241984 A | 12/2011 |
| JP | 5169656 B2 | 3/2013 |
| JP | 5604906 B2 | 10/2014 |
| JP | 6387970 B2 | 9/2018 |
| WO | 2015093463 A1 | 6/2015 |

* cited by examiner

DAMPER

CROSS REFERENCE TO RELATED APPLICATIONS

This application is based on and claims priority under 35 U.S.C. § 119 to Japanese Patent Application 2018-226023, filed on Nov. 30, 2018, the entire contents of which are incorporated herein by reference.

TECHNICAL FIELD

This disclosure relates to a damper.

BACKGROUND DISCUSSION

In the related art, there is known a damper including: a first rotating element and a second rotating element that are rotatable around a rotation center; an elastic element that elastically expands and contracts with relative rotation of the first rotating element and the second rotating element; and a limiter that is provided in the first rotating element and cuts off transmission of a torque exceeding a threshold value by slipping in a case where the torsional torque exceeds a threshold value (for example, International Publication No. WO2015/093463).

A limiter includes: a first cover plate; a second cover plate coupled to the first cover plate at one end and spaced from the first cover plate at the other end; a lining plate inserted between the first cover plate and the second cover plate; and a biasing member that is positioned between the second cover plate and the lining plate and generates a pressing force that presses the lining plate against the first cover plate.

In the limiter, a first sliding surface of the lining plate made of a metal material and a second sliding surface of the first cover plate made of a metal material directly abut against each other, and lining as a component different from the plate can be omitted. Accordingly, the number of components can be reduced, and for example, and reduction in size and manufacturing cost can be achieved.

In the damper of the related art, a frictional force between the first sliding surface and the second sliding surface is required to set the threshold value of the torque in the limiter, and a pressing force by a biasing member is required to obtain the frictional force. However, when the pressing force by the biasing member is large, the first cover plate is deformed, and accordingly, there is a concern that a gap is generated between the first sliding surface and the second sliding surface, and thus, any countermeasure is required.

Thus, a need exists for a novel damper which is not susceptible to the drawback mentioned above.

SUMMARY

A damper according to an aspect of this disclosure includes: a first rotating element that is rotatable around a rotation center; a second rotating element that is rotatable around the rotation center; an elastic element that elastically expands and contracts in response to relative rotation of the first rotating element and the second rotating element; and a limiter provided in the first rotating element. The limiter includes a lining plate having a first sliding surface which faces a first direction along an axial direction of the rotation center and is surface-hardened, a first cover plate having a second sliding surface which is in contact with the first sliding surface and a first abutting surface which is positioned radially outside the rotation center from the second sliding surface and faces a second direction opposite to the first direction, a second cover plate having an outer edge part which has a second abutting surface that abuts against the first abutting surface and is coupled to the first cover plate, and an inner edge part which projects radially inward from the outer edge part and is positioned away from the lining plate on a side opposite to the first cover plate. A biasing member which is provided between the inner edge part and the lining plate presses the first sliding surface against the second sliding surface. In a case where a value of a difference in torque between the lining plate and the first cover plate is equal to or greater than a predetermined value, the first sliding surface slides with the second sliding surface so that the lining plate and the first cover plate relatively rotate around the rotation center. The second sliding surface is inclined with respect to the first abutting surface so as to face the second direction as going radially inward in a free state of the first cover plate.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
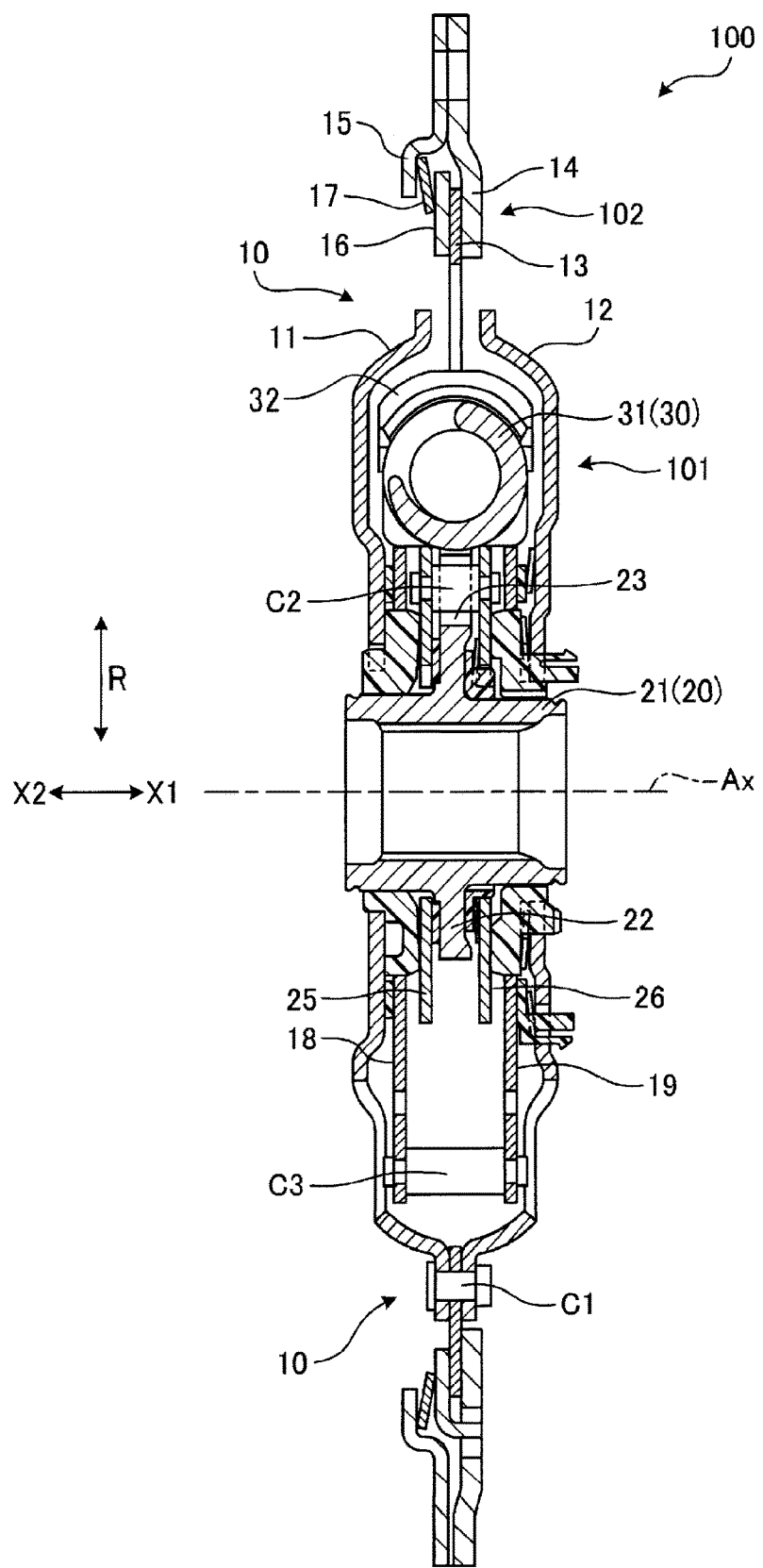
FIG. 1 is an exemplary schematic sectional view of a damper according to an embodiment.

Hereinafter, an exemplary embodiment disclosed here will be disclosed. The configurations of the embodiment illustrated below, and the operations and effects provided by the configurations are examples. This disclosure can also be realized by configurations other than those disclosed in the following embodiment. According to the disclosure, it is possible to obtain at least one of various effects (including derivative effects) obtained by the configuration.

In the following description, an axial direction of a rotation center Ax of a damper 100 is simply referred to as an axial direction, a radial direction of the rotation center Ax is simply referred to as a radial direction, and a circumferential direction around the rotation center Ax is simply referred to as a circumferential direction. In the drawing, a first direction along the axial direction is indicated by an arrow X1, a second direction opposite to the first direction is indicated by an arrow X2, a radially outward direction is indicated by an arrow R, and one of the circumferential directions (clockwise direction in FIG. 2) is indicated by an arrow C. In the specification, ordinal numbers are used only to distinguish components and members, and the order or priority is not indicated.

Embodiment

Schematic Configuration and Function of Damper

Figure 2:
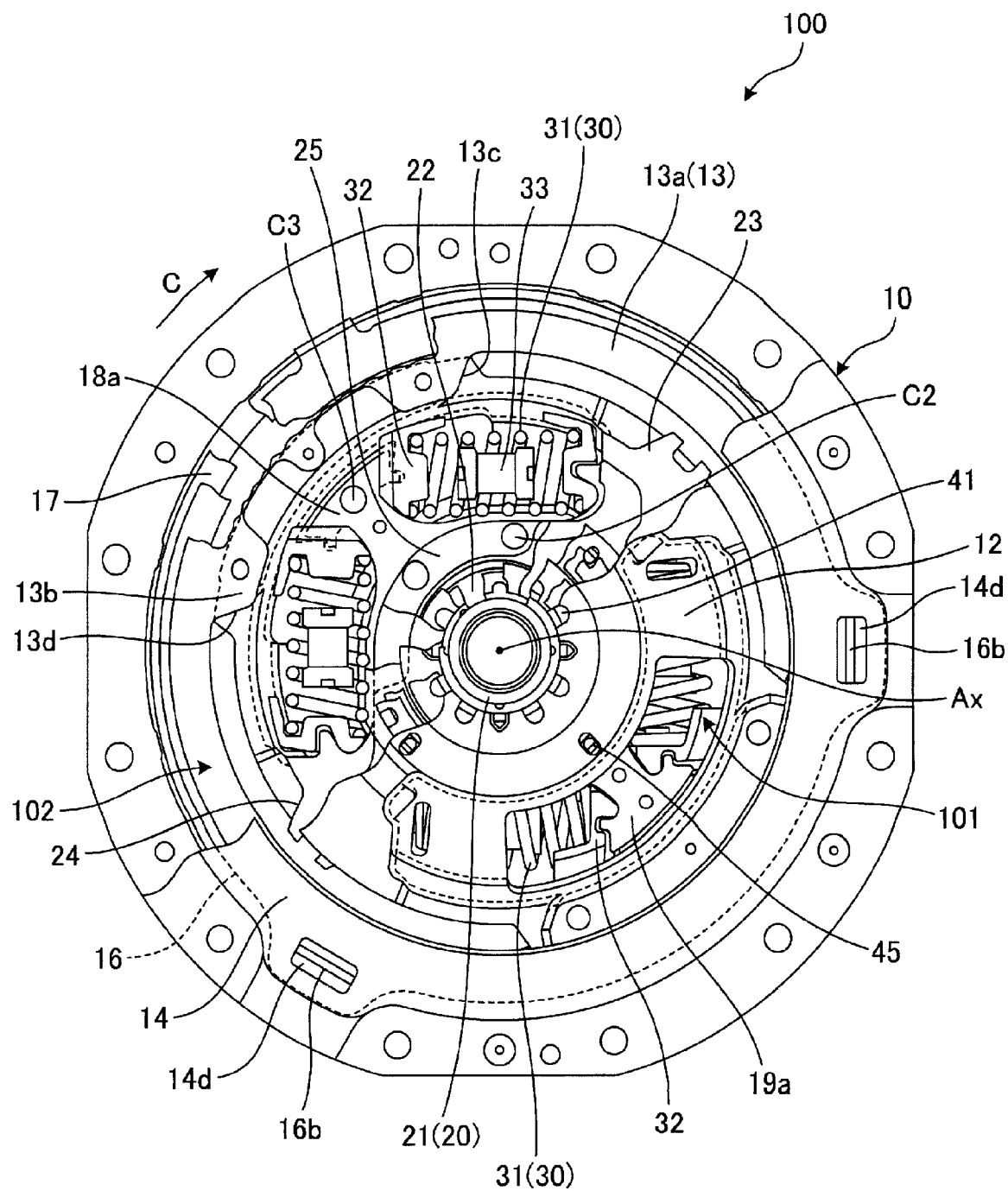
FIG. 2 is an exemplar schematic front view of the damper according to the embodiment.

FIG. 1 is a sectional view of the damper 100, and FIG. 2 is a front view of the damper 100. The damper 100 is provided, for example, between an engine on the input side and a transmission on the output side, and reduces rotational fluctuation (torque fluctuation) between the engine and the transmission. The damper 100 can reduce rotational fluctuation by the moment of inertia and the elastic expansion and contraction of the elastic member. The damper 100 is also referred to as a torque fluctuation absorber or the like.

The damper 100 is not limited between the engine and the transmission, but can be provided between the other two rotating elements, for example, between the engine and the motor generator. Moreover, the damper 100 can be provided in various vehicles, such as a hybrid vehicle, and a machine having a rotating element, for example.

As illustrated in FIG. 1, the damper 100 includes, for example, a damper portion 101 and a limiter 102. Of these, the limiter 102 is positioned radially outside the damper portion 101. The damper portion 101 is configured in a thin disk shape in the axial direction, and the limiter 102 is configured in an annular shape thinner than the damper portion 101 in the axial direction.

The damper portion 101 includes, for example, a drive member 10, a driven member 20, and an elastic element 30. The drive member 10 and the driven member 20 are arranged in the axial direction so as to be rotatable around the rotation center Ax. The rotation (torque) of the engine is transmitted to the transmission via the drive member 10 and the driven member 20. The drive member 10 is an example of a first rotating element, and the driven member 20 is an example of a second rotating element.

The elastic element 30 includes, for example, a plurality of coil springs 31 interposed between the drive member 10 and the driven member 20. As illustrated in FIG. 2, any of four coil springs 31 is a compression spring that extends along the circumferential direction and can be elastically compressed in the circumferential direction. The coil spring 31 is elastically compressed in accordance with the relative angle difference between the drive member 10 and the driven member 20.

When the drive member 10 is relatively twisted to one direction in the circumferential direction with respect to the driven member 20, the coil spring 31 releases energy accumulated by elastic compression, and by elastically stretching when the drive member 10 is twisted (when returning) to the other direction. In addition, when the drive member 10 is relatively twisted to the other direction in the circumferential direction with respect to the driven member 20, the coil spring 31 releases energy accumulated by elastic compression, and by elastically stretching when the drive member 10 is twisted (returned) to one direction. Due to such elastic expansion and contraction of the coil spring 31, transmission of the torque fluctuation from the drive member 10 to the driven member 20 is suppressed.

As illustrated in FIG. 1, the limiter 102 is provided in the middle of the drive member 10 in the radial direction. The limiter 102 includes, for example, a disc spring 17 that presses the lining plate 13 of the drive member 10 against the cover plate 14. The disc spring 17 is an example of a biasing member.

In the embodiment, in a state where the difference in torque between the lining plate 13 and the cover plate 14 is smaller than the threshold value within the set range, the limiter 102 does not slip due to the elastic pressing force of the disc spring 17, and the drive member 10 including the lining plate 13 and the cover plate 14 rotates integrally. In other words, in a state where the difference in torque between the lining plate 13 and the cover plate 14 is larger than the threshold value, the limiter 102 slips exceeding the frictional force due to the elastic pressing force of the disc spring 17. The limiter 102 functions as a torque limiter in this manner, and excessive torque transmission exceeding a set value is suppressed. In a case where a value of a difference in torque between the lining plate 13 and the first cover plate 14 is equal to or greater than a predetermined value, the first sliding surface 13a1 slides with the second sliding surface 14b1 so that the lining plate 13 and the first cover plate 14 relatively rotate around the rotation center Ax.

Detailed Configuration of Damper Portion

Figure 3:
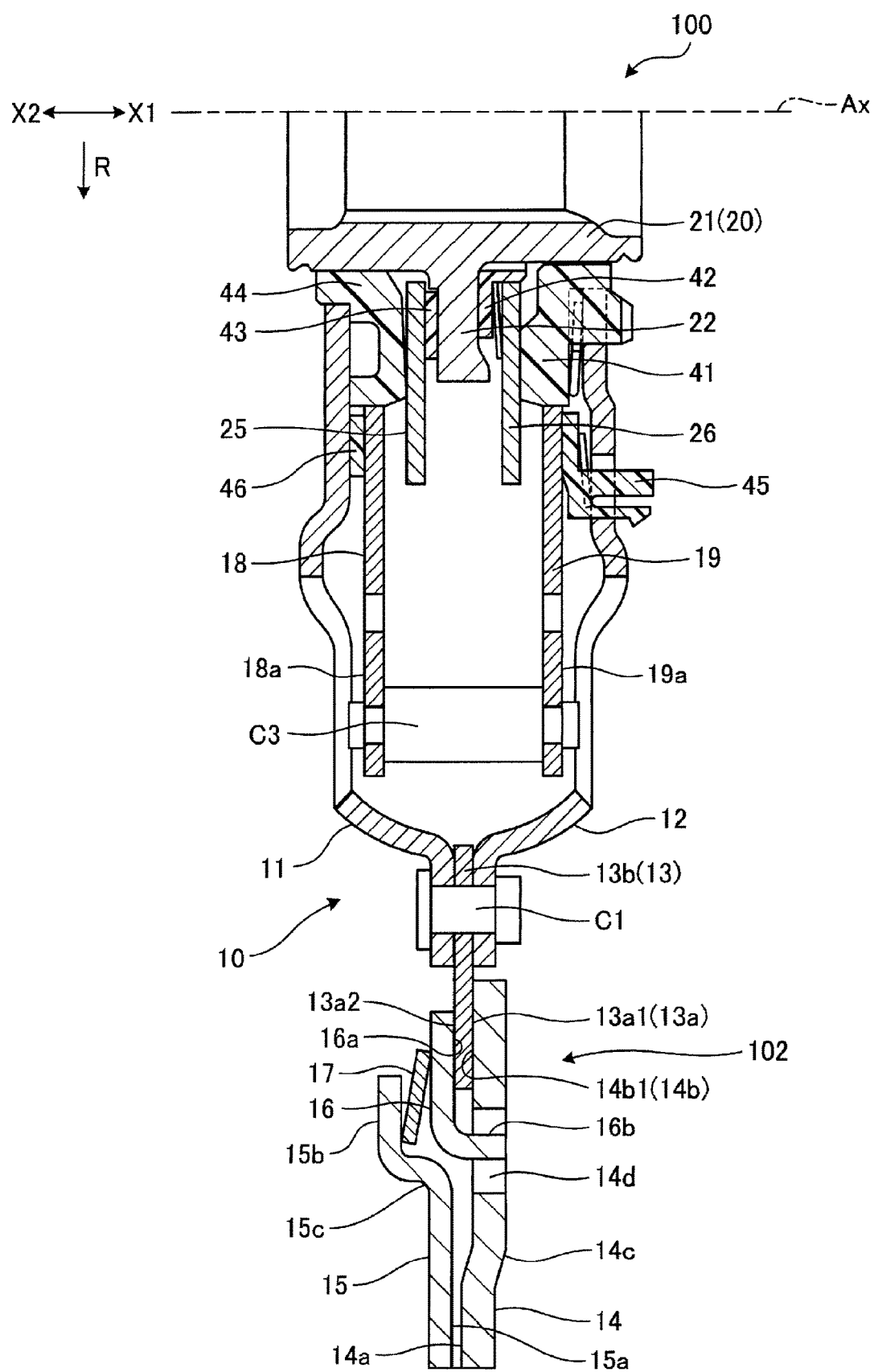
FIG. 3 is an enlarged view of a part of FIG. 1.

FIG. 3 is an enlarged view of a part of FIG. 1. As illustrated in FIG. 3, the drive member 10 includes, for example, side plates 11 and 12, the lining plate 13, the cover plates 14 and 15, a pressure plate 16, control plates 18 and 19, drive arms 18a and 19a.

Each of the side plates 11 and 12 has an annular plate shape that intersects the rotation center Ax and widens in the radial direction. The radially inner parts of the side plates 11 and 12 are disposed with a gap in the axial direction, and the radially outer parts are coupled together with the lining plate 13 by a fastening member C1, such as a rivet. Accordingly, the side plates 11 and 12 and the lining plate 13 are fixed and integrated in the circumferential direction.

The cover plates 14 and 15 and the pressure plate 16 are positioned radially outside the lining plate 13. The cover plate 14 and the pressure plate 16 have an annular shape, are slightly displaced in the radial direction from an annular portion 13a of the lining plate 13, and are slidable in surface contact with the annular portion 13a. The pressure plate 16 is provided with an opening portion 14d of the cover plate 14 and a claw portion 16b that is caught in the circumferential direction. The cover plates 14 and 15 are coupled together with a flywheel by a fastening member, such as a bolt (not illustrated) that penetrates the respective opening portions 14e and 15e (refer to FIG. 4) in the axial direction. Accordingly, the cover plates 14 and 15, the pressure plate 16, and the flywheel are fixed and integrated in the circumferential direction.

The control plates 18 and 19 are provided in parallel to each other with an interval in the axial direction between the side plates 11 and 12. The control plate 18 is positioned between the side plate 11 and the flange plate 22 of the driven member 20, and the control plate 19 is positioned between the side plate 12 and the flange plate 22. Each of the control plates 18 and 19 has an annular plate shape that intersects the rotation center Ax and widens in the radial direction.

The control plates 18 and 19 are supported so as to be rotatable around the rotation center Ax via sliding members 44 and 41 provided on the outer circumference of a hub 21 of the driven member 20. The sliding members 44 and 41 engage with the inner circumferences of the side plates 11 and 12 and are in contact with the control plates 25 and 26 of the driven member 20 in the axial direction. The sliding members 44 and 41 function as a friction resistance element that slides in accordance with the relative rotation of the control plates 18 and 19 and the side plates 11 and 12 with the hub 21 and the control plates 25 and 26.

Sliding members 46 and 45 are respectively provided between the control plates 18 and 19 and the side plates 11 and 12. The sliding members 46 and 45 function as a friction resistance element that slides in accordance with the relative rotation of the control plates 18 and 19 and the side plates 11 and 12. However, the relative rotation between the control plates 18 and 19 and the side plates 11 and 12 is limited to a predetermined angle range since the stoppers (not illustrated) abut against each other.

The drive arms 18a and 19a project radially outward from the control plates 18 and 19. The drive arms 18a and 19a have a plate shape that intersects the rotation center Ax. The drive arms 18a and 19a are integrally coupled by a fastening member C3, such as a rivet.

In addition, the control plates 18 and 19 are provided with two drive arms 18a and 19a (refer to FIG. 2) extending in the opposite directions in the radial direction. The two drive arms 18a and 19a are respectively positioned between the two coil springs 31. In other words, the drive arms 18a and 19a are disposed at intervals of 180° in the circumferential direction.

The driven member 20 includes, for example, a hub 21, a flange plate 22, driven arms 23 and 24, and control plates 25 and 26 (refer to FIGS. 1 and 3). The shape of the hub 21 is a cylindrical shape along the rotation center Ax. The hub 21 is coupled to an input shaft of the transmission by, for example, spline fitting, and rotates integrally with the input shaft.

The flange plate 22 projects radially outward from the hub 21. The shape of the flange plate 22 is an annular plate shape that widens along the radial direction. The flange plate 22 is positioned radially inward from the coil spring 31.

The driven arms 23 and 24 (refer to FIG. 2) project radially outward from the flange plate 22. The shape of the driven arms 23 and 24 is a plate shape that intersects the rotation center Ax. The driven arms 23 and 24 are also referred to as a center plate or the like.

The two driven arms 23 and 24 extend from the flange plate 22 in the opposite directions in the radial direction, and are respectively positioned between the two coil springs 31. In other words, the driven arms 23 and 24 are disposed at intervals of 180° in the circumferential direction. In addition, the driven arms 23 and 24 are displaced from the drive arms 18a and 19a by 90° in the circumferential direction. The driven arm 23 is an example of a first arm, and the driven arm 24 is an example of a second arm.

The control plates 25 and 26 (refer to FIGS. 1 and 3) are provided in parallel to each other with an interval in the axial direction between the side plates 11 and 12. The control plate 25 is positioned between the flange plate 22 and the control plate 18, and the control plate 26 is positioned between the flange plate 22 and the control plate 19. Each of the control plates 25 and 26 has an annular plate shape that intersects the rotation center Ax and widens in the radial direction. The control plates 25 and 26 are integrally coupled by a fastening member C2, such as a rivet.

Sliding members 43 and 42 (refer to FIG. 3) are respectively provided between the control plates 25 and 26 and the flange plate 22. The sliding members 43 and 42 function as a frictional resistance element that slides in accordance with the relative rotation between the control plates 25 and 26 and the flange plate 22. However, the relative rotation between the control plates 25 and 26 and the flange plate 22 is limited to a predetermined angle range since the fastening member C2 and the driven arms 23 and 24 abut against each other (refer to FIG. 2).

The coil spring 31 is positioned between the drive arms 18a and 19a and the driven arms 23 and 24. In such a configuration, when one edge part in the circumferential direction in the drive arms 18a and 19a and the other edge part in the circumferential direction of the driven arms 23 and 24 relatively rotate in a direction of approaching each other, the coil spring 31 elastically contracts due to the edge parts. On the other hand, when one edge part in the circumferential direction in the drive arms 18a and 19a and the other edge part in the circumferential direction in the driven arms 23 and 24 relatively rotate in a direction of going away from each other in an elastically contracted state, the coil spring 31 elastically extends.

In this manner, the coil spring 31 is positioned between the drive arms 18a and 19a and the driven arms 23 and 24, and elastically expands and contracts with the relative rotation of the drive arms 18a and 19a and the driven arms 23 and 24. The coil spring 31 elastically contracts to store torque as a compression force, and elastically extends to release the compression force as torque. The damper portion 101 can relieve torque fluctuations by such expansion and contraction of the coil spring 31.

The elastic element 30 includes, for example, a supporting member 32 and a cushion member 33. The cushion member 33 is provided in the coil of the coil spring 31 and functions as an elastic member.

The supporting members 32 are provided at both ends of the coil spring 31 in the circumferential direction. The supporting member 32 is a retainer, for example. The supporting member 32 can have a function of supporting the coil spring 31 more stably, elastically deforming the coil spring 31 more stably, or suppressing direct contact of the coil spring 31, the drive arms 18a and 19a, and the driven arms 23 and 24.

In addition, the relative rotation of the drive member 10 and the driven member 20 is limited within a predetermined angle range since the driven arms 23 and 24 and the stoppers 13c and 13d of the lining plate 13 abut against each other. Accordingly, excessive compression of the coil spring 31 and the cushion member 33 is suppressed.

Detailed Configuration of Limiter

Figure 4:
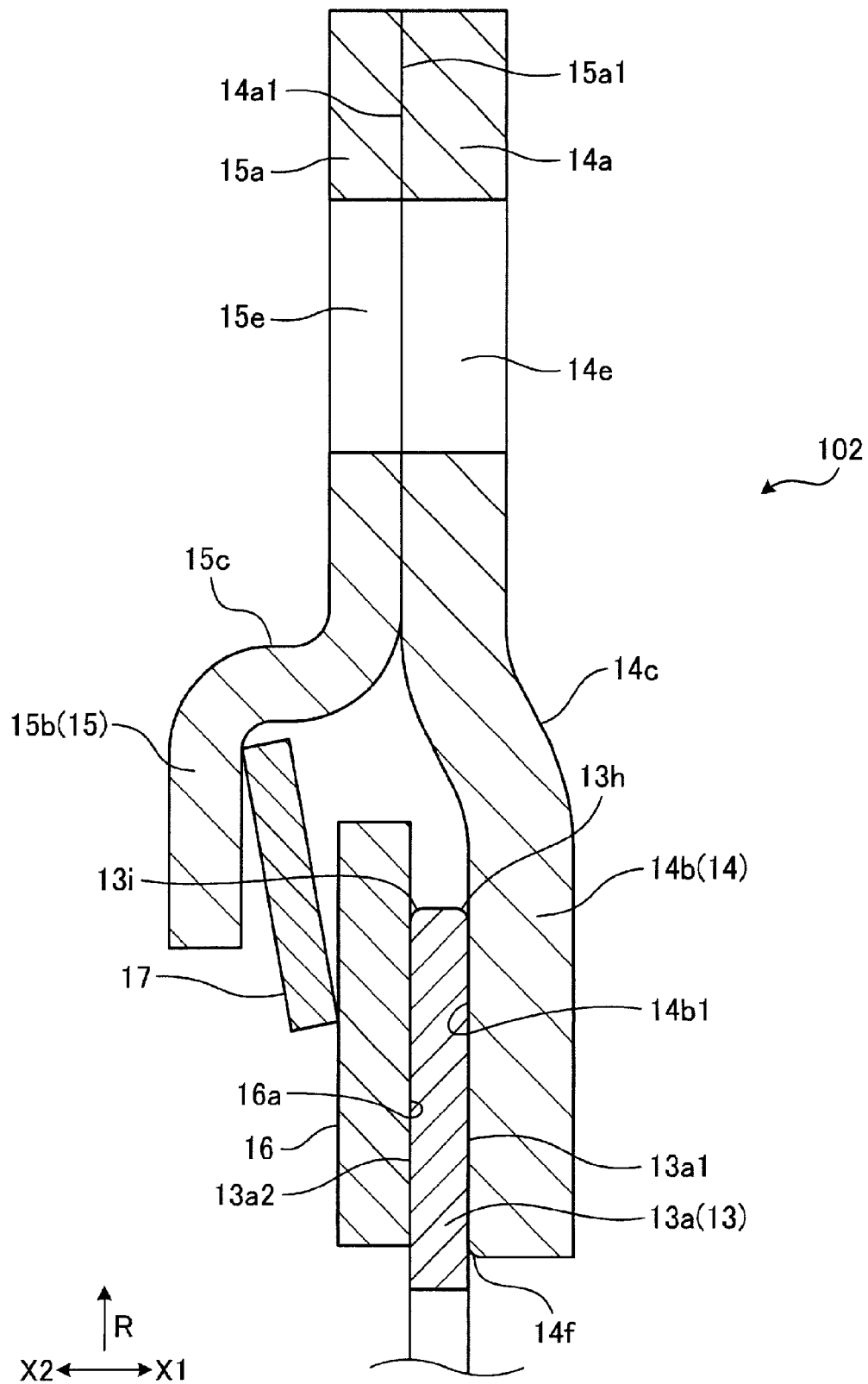
FIG. 4 is an exemplary sectional view of a part provided with a limiter in the damper according to the embodiment.

FIG. 4 is a sectional view of the limiter 102. As illustrated in FIG. 4, the limiter 102 includes, for example, the cover plate 14, the lining plate 13, the pressure plate 16, the disc spring 17, and the cover plate 15 from the right side to the left side in FIG. 4, that is, as going in the second direction X2. The cover plate 14, the lining plate 13, the pressure plate 16, the disc spring 17, and the cover plate 15 overlap each other in close contact with each other in the axial direction.

The cover plate 14 has, for example, an outer edge part 14a, an inner edge part 14b, and a curved part 14c. The shape of the outer edge part 14a is an annular plate shape that intersects the rotation center Ax. The outer edge part 14a has an abutting surface 14a1 that faces the second direction X2 and abuts against the cover plate 15. The abutting surface 14a1 extends along the radial direction. The abutting surface 14a1 is an example of a first abutting surface.

The shape of the inner edge part 14b is an annular plate shape smaller than the outer edge part 14a that intersects the rotation center Ax. The inner edge part 14b has a sliding surface 14b1 which is in contact with the lining plate 13. The sliding surface 14b1 extends along the radial direction in a state where the limiter 102 is assembled. The sliding surface 14b1 is an example of a second sliding surface.

In addition, the inner edge part 14b is positioned away from the outer edge part 14a on a side opposite to the cover plate 15, and is connected to the outer edge part 14a via the curved part 14c. In other words, the cover plate 14 is bent in a crank shape by the curved part 14c. The cover plate 14 is an example of a first cover plate.

The cover plate 15 has, for example, an outer edge part 15a, an inner edge part 15b, and an intermediate part 15c.

The shape of the outer edge part 15a is an annular plate shape that intersects the rotation center Ax. The outer edge part 15a has an abutting surface 15a1 that abuts against the abutting surface 14a1 of the cover plate 14. The outer edge part 15a is coupled to the cover plate 14 by a fastening member (not illustrated) that penetrates the above-described opening portions 14e and 15e in the axial direction. The abutting surface 15a1 is an example of a second abutting surface.

The shape of the inner edge part 15b is an annular plate shape smaller than the outer edge part 15a that intersects the rotation center Ax. The inner edge part 15b is positioned away from the outer edge part 15a and the lining plate 13 on a side opposite to the cover plate 14. The intermediate part 15c has a cylindrical shape around the rotation center Ax, and connects the outer edge part 15a and the inner edge part 15b to each other. The intermediate part 15c covers the outer circumference of the disc spring 17 and the pressure plate 16. The cover plate 15 is an example of a second cover plate. The cover plate 15 is also referred to as a support plate.

The pressure plate 16 is positioned between the cover plate 14 and the cover plate 15. The shape of the pressure plate 16 is an annular plate shape that intersects the rotation center Ax. The pressure plate 16 has a sliding surface 16a that is in contact with the lining plate 13, and a claw portion 16b (refer to FIG. 3) that projects into the opening portion 14d of the cover plate 14. The sliding surface 16a is an example of a fourth sliding surface.

The disc spring 17 is interposed between the cover plate 15 and the pressure plate 16 and elastically presses the pressure plate 16 toward the cover plate 14 in the axial direction. The pressure plate 16 and the disc spring 17 configure a thrust applying mechanism (biasing mechanism), and press the lining plate 13 toward the cover plate 14.

Figure 5:
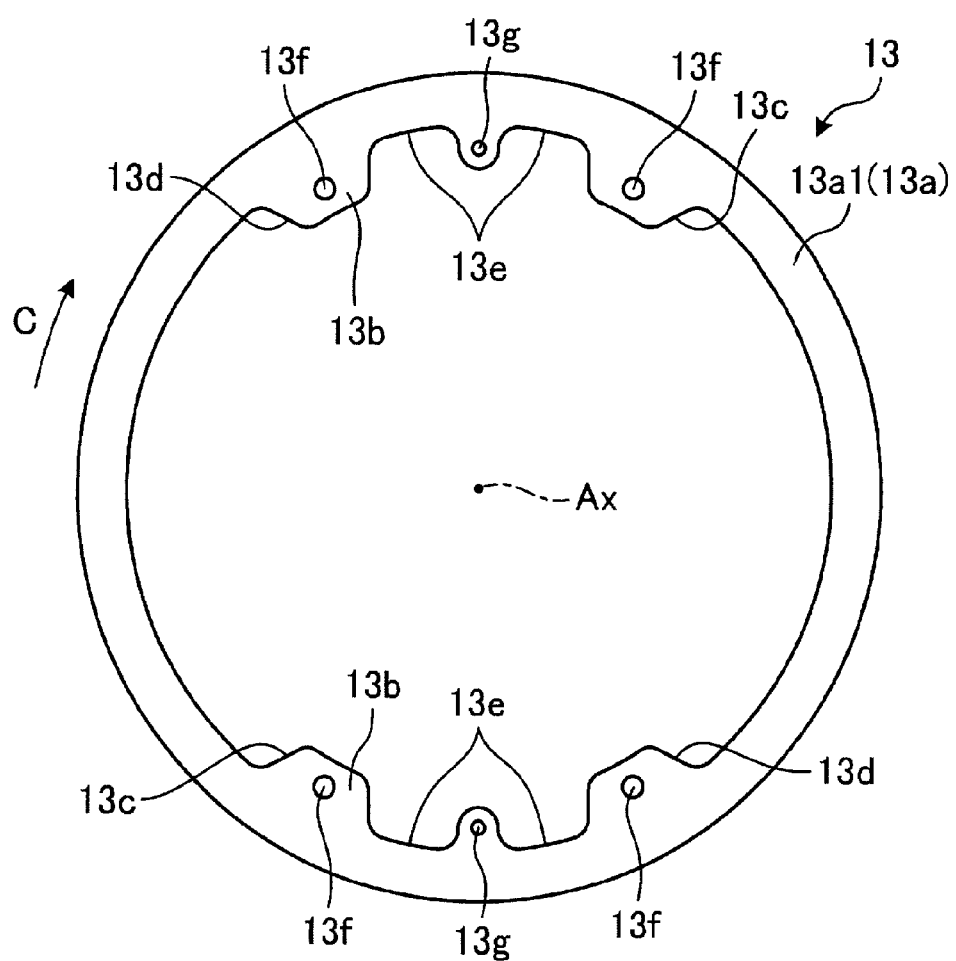
FIG. 5 is an exemplary plan view of a lining plate of the damper according to the embodiment.

FIG. 5 is a plan view of the lining plate 13. As illustrated in FIG. 5, the lining plate 13 includes, for example, the annular portion 13a and an inward flange 13b. The inward flange 13b projects radially inward from the annular portion 13a. The inward flange 13b is an example of a projecting portion. The lining plate 13 is made of a metal material, such as an SPH (hot rolled steel plate) material. The SPH material is a type of low carbon steel and has a relatively low hardness. For example, the hardness of SPH270 is approximately Hv (Vickers hardness) 100.

The shape of the annular portion 13a is an annular plate shape that intersects the rotation center Ax. As illustrated in FIG. 4, the annular portion 13a is sandwiched between the cover plate 14 and the pressure plate 16. In other words, the annular portion 13a has a sliding surface 13a1 which is in contact with the sliding surface 14b1 and a sliding surface 13a2 which is in contact with the sliding surface 16a. The sliding surface 13a1 faces the first direction X1, and the sliding surface 13a2 faces the second direction X2. The sliding surface 13a1 is an example of a first sliding surface, and the sliding surface 13a2 is an example of a third sliding surface.

With respect to the sliding surfaces 13a1 and 13a2, for example, processing for making the surface rough, such as shot blasting, processing for hardening the surface (film layer), such as gas soft nitriding, processing for making it difficult to cause rust of the surface (film layer), such as steam treatment, or the like, is performed. Accordingly, the wear resistance of the sliding surfaces 13a1 and 13a2 can be increased, and the friction coefficient during the sliding can be increased or stabilized. Shot blasting, gas soft nitriding, and steam treatment are examples of surface hardening.

As illustrated in FIGS. 2 and 5, the inward flange 13b is provided with the stopper 13c facing the driven arm 23 and the stopper 13d facing the driven arm 24. The two stoppers 13c and 13d face each other in the opposite circumferential directions. The stopper 13c limits the rotation of the driven member 20 to the other direction in the circumferential direction with respect to the drive member 10 by abutting against the driven arm 23. Further, the stopper 13d limits the rotation of the driven member 20 to one direction in the circumferential direction with respect to the drive member 10 by abutting against the driven arm 24. The stopper 13c is an example of a first stopper, and the stopper 13d is an example of a second stopper.

The annular portion 13a is provided with two inward flanges 13b with an interval in the circumferential direction. The inward flange 13b is positioned between the two driven arms 23 and 24, respectively. In other words, the inward flanges 13b are disposed at intervals of 180° in the circumferential direction. In the embodiment, by performing processing, such as annealing, with respect to only the inward flange 13b of the lining plate 13, the hardness of the inward flange 13b becomes lower than the hardness of the annular portion 13a.

In addition, each inward flange 13b is provided with a cutout portion 13e (refer to FIG. 5) that is recessed radially outward and opened radially inward. Two cutout portions 13e are provided in each inward flange 13b. The two cutout portions 13e are arranged in the circumferential direction. In the embodiment, the thickness of the lining plate 13 in the axial direction is set to be thinner than the thicknesses of the cover plate 14 and the pressure plate 16 in the axial direction. With such a configuration, the lining plate 13 is more easily deformed in the axial direction than the cover plate 14 and the pressure plate 16. In addition, as illustrated in FIG. 5, the inward flange 13b is provided with a through hole 13f through which the fastening member C1 (rivet) passes and a through hole 13g into which a positioning pin is inserted.

Figure 6:
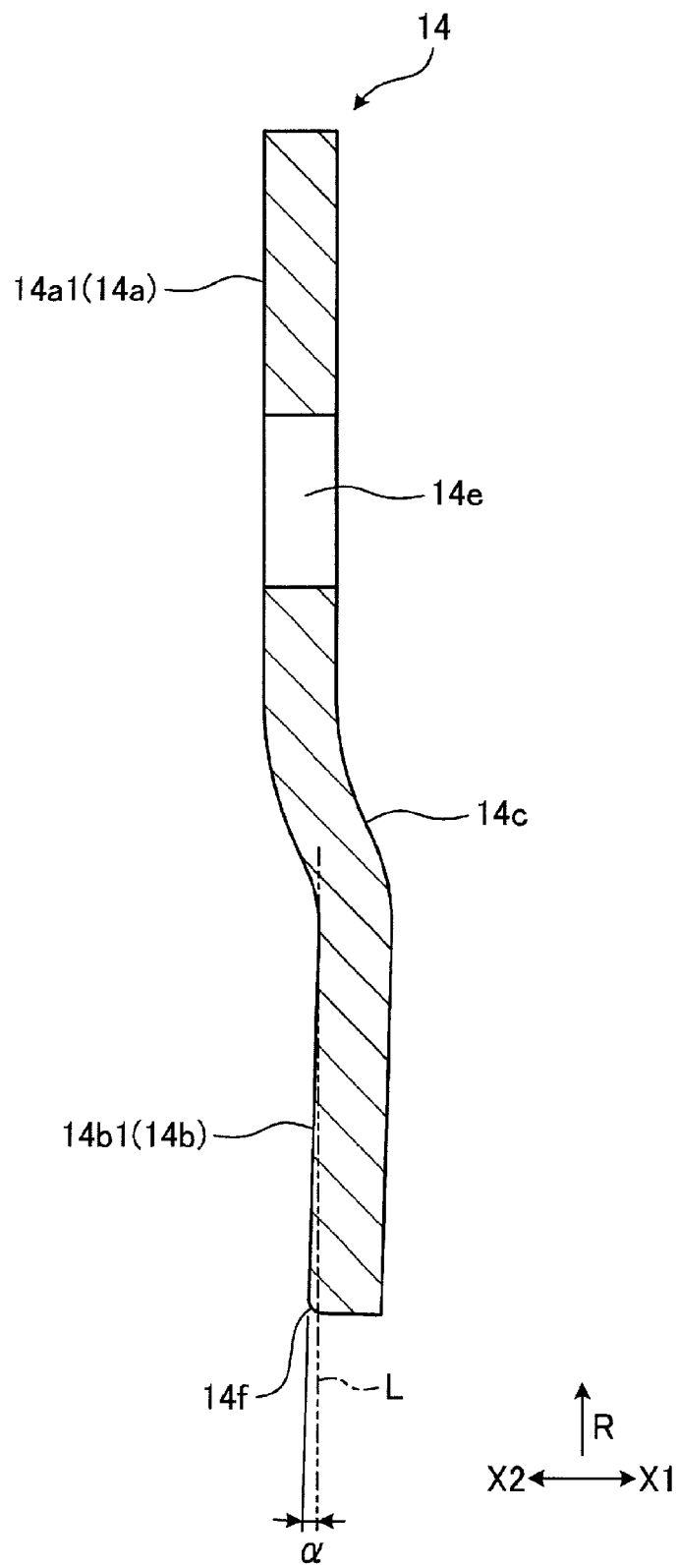
FIG. 6 is an exemplary schematic sectional view of a first cover plate in a free state in the damper according to the embodiment.

FIG. 6 is a sectional view of the cover plate 14 in a free state. As illustrated in FIG. 6, in the embodiment, in the free state of the cover plate 14, the sliding surface 14b1 is inclined with respect to a reference line L parallel to the abutting surface 14a1 so as to face the second direction X2 as going radially inward. From such a configuration, the inclination of the sliding surface 14b1 is reduced by the pressing force of the disc spring 17, and the sliding surface 14b1 is in a state of being substantially along the radial direction. An inclination angle α of the sliding surface 14b1 with respect to the reference line L (abutting surface 14a1) is, for example, 1° to 10°.

In addition, in the embodiment, the radially inner edge 14f of the sliding surface 14b1 is formed in a curved surface shape. Accordingly, local sliding with the edge 14f and the sliding surface 13a1 (refer to FIG. 4) is suppressed. The edge 14f is, for example, a part formed by shearing and having a roundness formed on a punch side of a sheared cross section. In addition, the edge 14f is not limited to this example, and may be, for example, an edge (so-called corner R portion) rounded into a curved surface shape or a chamfered edge. In the embodiment, the radially outer edges 13h and 13i of the sliding surfaces 13a1 and 13a2 of the lining plate 13 are also formed in a curved surface shape. Accordingly, local sliding with the edges 13h and 13i and the sliding surfaces 14b1 and 16a is suppressed.

As described above, in the embodiment, for example, in the free state of the cover plate 14 (first cover plate), the sliding surface 14b1 (second sliding surface) is inclined with respect to the abutting surface 14a1 (first abutting surface) so as to face the second direction X2 as going radially inward. In a case where the sliding surface 14b1 is configured to be along the radial direction in the free state where the cover plate 14 is not incorporated in the damper 100 and the pressing force by the disc spring 17 does not act, the cover plate 14 incorporated in the damper 100 is elastically deformed such that the sliding surface 14b1 is in an inclined posture facing the first direction X1 as going radially inward by the pressing force of the disc spring 17. Accordingly, as described above, according to the configuration in which the sliding surface 14b1 is inclined in advance so as to face the second direction X2 opposite to the first direction X1 as going radially inward in the free state of the cover plate 14, by the pressing force of the disc spring 17, the cover plate 14 is elastically deformed such that the inclination of the sliding surface 14b1 is reduced and the sliding surface 14b1 is approximately along the radial direction. Accordingly, in the assembled damper 100, the gap between the sliding surface 13a1 and the sliding surface 14b1 can be reduced.

Further, in the embodiment, for example, the limiter 102 has a pressure plate 16 which is provided between the lining plate 13 and the disc spring 17, rotates integrally with the cover plate 14 in a case where a value of a difference in torque between the lining plate 13 and the cover plate 14 is equal to or greater than a predetermined value so that the sliding surface 16a (fourth sliding surface) slides with the sliding surface 13a2 (third sliding surface). According to such a configuration, for example, a sliding torque can be obtained on both sides of the lining plate 13 in the axial direction by the pressure plate 16 and the cover plate 14.

In addition, in the embodiment, for example, the lining plate 13 is provided with the cutout portion 13e which is recessed radially outward between the stopper 13c (first stopper) and the stopper 13d (second stopper) and is opened radially inward. According to such a configuration, for example, the inward flange 13b (projecting portion) is easily elastically deformed compared to a case where there is no cutout portion 13e. Therefore, for example, the sliding surface 13a1 (first sliding surface) is easily along the sliding surface 14b1 (second sliding surface), and a gap between the sliding surface 13a1 and the sliding surface 14b1 is further less likely to occur.

In addition, in the embodiment, for example, the hardness of the inward flange 13b is lower than the hardness of the annular portion 13a. According to such a configuration, for example, since the inward flange 13b is more easily elastically deformed, the sliding surface 13a1 is more easily along the sliding surface 14b1, and a gap between the sliding surface 13a1 and the sliding surface 14b1 is further less likely to occur.

In addition, in the embodiment, for example, the radially inner edge 14f of the sliding surface 14b1 is a curved edge or a chamfered edge. According to such a configuration, for example, it is possible to suppress cutting of the sliding surface 13a1 by the edge 14f of the sliding surface 14b1.

In addition, in the embodiment, for example, the radially outer edge 13h of the sliding surface 13a1 and the radially outer edge 13i of the sliding surface 13a2 are curved edges or chamfered edges. According to such a configuration, for example, it is possible to suppress the cutting of the sliding surface 14b1 by the edge 13h of the sliding surface 13a1 with a simple configuration, and it is possible to suppress the cutting of the sliding surface 16a by the edge 13i of the sliding surface 13a2 with a simple configuration.

A damper 100 according to an aspect of this disclosure includes: a drive member 10 that is rotatable around a rotation center Ax; a driven member 10 that is rotatable around the rotation center Ax; an elastic element 30 that elastically expands and contracts in response to relative rotation of the drive member 10 and the driven member 20; and a limiter 102 provided in the drive member 10. The limiter 102 includes a lining plate 13 having a first sliding surface 13a1 which faces a first direction X1 along an axial direction of the rotation center Ax and is surface-hardened, a first cover plate 14 having a second sliding surface 14a1 which is in contact with the first sliding surface 13a1 and a first abutting surface 14a1 which is positioned radially outside the rotation center Ax from the second sliding surface 14b1 and faces a second direction X2 opposite to the first direction X1, a second cover plate 15 having an outer edge part 15a which has a second abutting surface 15a1 that abuts against the first abutting surface 14a1 and is coupled to the first cover plate, and an inner edge part 15b which projects radially inward from the outer edge part 15a and is positioned away from the lining plate 13 on a side opposite to the first cover plate 14. A biasing member 17 which is provided between the inner edge part 15b and the lining plate 13 presses the first sliding surface 13a1 against the second sliding surface 14b1. In a case where a value of a difference in torque between the lining plate 13 and the first cover plate 14 is equal to or greater than a predetermined value, the first sliding surface 13a1 slides with the second sliding surface 14b1 so that the lining plate 13 and the first cover plate 14 relatively rotate around the rotation center Ax. The second sliding surface 14b1 is inclined with respect to the first abutting surface 14a1 so as to face the second direction X2 as going radially inward in a free state of the first cover plate 14.

In a case where the second sliding surface 14b1 is configured to be along the radial direction in a free state where the first cover plate 14 is not incorporated in the damper 100 and the pressing force by the biasing member 17 does not act, the first cover plate 14 incorporated in the damper 100 is elastically deformed such that the second sliding surface 14b1 is in an inclined posture facing the first direction X1 as going radially inward by the pressing force of the biasing member 17. Accordingly, as described above, according to the configuration in which the second sliding surface 14b1 is inclined in advance so as to face the second direction X2 opposite to the first direction X1 as going radially inward in the free state of the first cover plate 14, by the pressing force of the biasing member 17, the first cover plate 14 is elastically deformed such that the inclination of the second sliding surface 14b1 is reduced and the second sliding surface 14b1 is approximately along the radial direction. Thereby, a gap between the first sliding surface 13a1 and the second sliding surface 14b1 can be reduced in the assembled damper 100.

In the damper 100, the lining plate 13 may have a third sliding surface 13a2 which faces the second direction X2 and is surface-hardened, and the limiter 102 may have a pressure plate 16 which has a fourth sliding surface 16a that is in contact with the third sliding surface 13a2, is provided between the lining plate 13 and the biasing member 17, and rotates integrally with the first cover plate 14 around the rotation center Ax in a case where the value of the difference in torque between the lining plate 13 and the first cover plate 14 is equal to or greater than the predetermined value so that the fourth sliding surface 16a slides with the third sliding surface 13a2. According to such a configuration, for example, a sliding torque can be obtained on both sides of the lining plate 13 in the axial direction by the pressure plate 16 and the first cover plate 14.

In the damper 100, the lining plate 13 may have an annular portion 13a having the first sliding surface 13a1 or the third sliding surface 13a2, and a projecting portion 13b that projects radially inward from the annular portion 13a, the driven member 20 may have a first arm 23 that projects radially outward and a second arm 24 different from the first arm 23 that projects radially outward, the projecting portion 13b may have a first stopper 13c that faces one direction in a circumferential direction of the rotation center Ax and limits rotation of the driven member 20 to the other direction in the circumferential direction with respect to the drive member 10 by abutting against the first arm 23, and a second stopper 13d that faces the other direction in the circumferential direction and limits rotation of the driven member 20 to the one direction in the circumferential direction with respect to the drive member 10 by abutting against the second arm 24, and the lining plate 13 may be provided with a cutout portion 13e which is recessed radially outward between the first stopper 13c and the second stopper 13d, and is opened radially inward. According to such a configuration, for example, the projecting portion 13b is easily elastically deformed compared to a case where there is no cutout portion 13e. Therefore, for example, the first sliding surface 13a1 is easily along the second sliding surface 14b1, and a gap between the first sliding surface 13a1 and the second sliding surface 14b1 is further less likely to occur.

Further, in the damper 100, for example, a hardness of the projecting portion 13b may be lower than a hardness of the annular portion 13a. According to such a configuration, for example, since the projecting portion 13b is more easily elastically deformed, the first sliding surface 13a1 is more easily along the second sliding surface 14b1, and a gap between the first sliding surface 13a1 and the second sliding surface 14b1 is further less likely to occur.

In the damper 100, a radially inner edge 14f of the second sliding surface 14b1 may be a curved edge or a chamfered edge. According to such a configuration, for example, it is possible to suppress cutting of the first sliding surface 13a1 by the edge 14f of the second sliding surface 14b1.

In the damper 100, for example, at least one of a radially outer edge 13h of the first sliding surface 13a1 and a radially outer edge 13i of the third sliding surface 13a2 may be a curved edge or a chamfered edge. According to such a configuration, for example, it is possible to suppress the cutting of the second sliding surface 14b1 by the edge 13h of the first sliding surface 13a1, or to suppress the cutting of the fourth sliding surface 16a by the edge 13i of the third sliding surface 13a2.

The following configurations may preferably be adopted for obtaining the above-described effects. That is, a thickness of the lining plate 13 in the axial direction may be thinner than a thickness of the drive member 10 in the axial direction. In addition, in a free state of the drive member 10, an angle of the second sliding surface 14b 1 inclined with respect to the first abutting surface 14a1 may be 1° to 10°.

Above, although the embodiment disclosed here has been described, the above-described embodiment is merely an example, and does not limit the range of disclosure. The above-described embodiment can be implemented in other various forms, and various omissions, substitutions, combinations, and modifications can be made without departing from the scope of the disclosure. In addition, specifications (structure, type, direction, form, size, length, width, thickness, height, number, arrangement, position, material, and the like) of each configuration, shape, and the like can be appropriately changed and implemented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damper comprising:
   a first rotating element that is rotatable around a rotation center;
   a second rotating element that is rotatable around the rotation center;
   an elastic element that elastically expands and contracts in response to relative rotation of the first rotating element and the second rotating element; and
   a limiter provided in the first rotating element, wherein the limiter includes
      a lining plate having a first sliding surface which faces a first direction along an axial direction of the rotation center and is surface-hardened,
      a first cover plate having a second sliding surface which is in contact with the first sliding surface and a first abutting surface which is positioned radially outside the rotation center from the second sliding surface and faces a second direction opposite to the first direction,
      a second cover plate having an outer edge part which has a second abutting surface that abuts against the first abutting surface and is coupled to the first cover plate, and an inner edge part which projects radially inward from the outer edge part and is positioned away from the lining plate on a side opposite to the first cover plate, and
      a biasing member which is provided between the inner edge part and the lining plate and presses the first sliding surface against the second sliding surface,
   in a case where a value of a difference in torque between the lining plate and the first cover plate is equal to or greater than a predetermined value, the first sliding surface slides with
   the second sliding surface so that the lining plate and the first cover plate relatively rotate around the rotation center, and
   the second sliding surface is, in a free state of the first cover plate, inclined with respect to the first abutting surface towards the second direction on a radially inward side of the second sliding surface.

2. The damper according to claim 1, wherein
   the lining plate has a third sliding surface which faces the second direction and is surface-hardened, and
   the limiter has a pressure plate which has a fourth sliding surface that is in contact with the third sliding surface, is provided between the lining plate and the biasing member, and rotates integrally with the first cover plate around the rotation center in a case where the value of the difference in torque between the lining plate and the first cover plate is equal to or greater than the predetermined value so that the fourth sliding surface slides with the third sliding surface.

3. The damper according to claim 1, wherein the lining plate has an annular portion having the first sliding surface, and a projecting portion that projects radially inward from the annular portion, the second rotating element has a first arm that projects radially outward and a second arm different from the first arm that projects radially outward, the projecting portion has a first stopper that faces one direction in a circumferential direction of the rotation center and limits rotation of the second rotating element to the other direction in the circumferential direction with respect to the first rotating element by abutting against the first arm, and a second stopper that faces the other direction in the circumferential direction and limits rotation of the second rotating element to the one direction in the circumferential direction with respect to the first rotating element by abutting against the second arm, and the lining plate is provided with a cutout portion which is recessed radially outward between the first stopper and the second stopper, and is opened radially inward.

4. The damper according to claim 3, wherein a hardness of the projecting portion is lower than a hardness of the annular portion.

5. The damper according to claim 1, wherein a radially inner edge of the second sliding surface is a curved edge or a chamfered edge.

6. The damper according to claim 1, wherein a radially outer edge of the first sliding surface is a curved edge or a chamfered edge.

7. The damper according to claim 1, wherein a thickness of the lining plate in the axial direction is thinner than a thickness of the first cover plate in the axial direction.

8. The damper according to claim 1, wherein in a free state of the first rotating element, an angle of the second sliding surface inclined with respect to the first abutting surface is 1° to 10°.

9. The damper according to claim 1, wherein the lining plate has a third sliding surface which faces the second direction and is surface-hardened, the lining plate has an annular portion having the third sliding surface, and a projecting portion that projects radially inward from the annular portion, the second rotating element has a first arm that projects radially outward and a second arm different from the first arm that projects radially outward, the projecting portion has a first stopper that faces one direction in a circumferential direction of the rotation center and limits rotation of the second rotating element to the other direction in the circumferential direction with respect to the first rotating element by abutting against the first arm, and a second stopper that faces the other direction in the circumferential direction and limits rotation of the second rotating element to the one direction in the circumferential direction with respect to the first rotating element by abutting against the second arm, and the lining plate is provided with a cutout portion which is recessed radially outward between the first stopper and the second stopper, and is opened radially inward.

10. The damper according to claim 1, wherein the lining plate has a third sliding surface which faces the second direction and is surface-hardened, and a radially outer edge of the third sliding surface is a curved edge or a chamfered edge.

\* \* \* \* \*